US008364602B2

(12) United States Patent
Femenia et al.

(10) Patent No.: US 8,364,602 B2
(45) Date of Patent: Jan. 29, 2013

(54) AUTOMATED CROSS-CULTURAL CONFLICT MANAGEMENT

(75) Inventors: Nora Femenia, Fort Lauderdale, FL (US); Brenda Pomerance, New York, NY (US)

(73) Assignee: eBay, Inc., San Jose, CA (US)

( * ) Notice: Subject to any disclaimer, the term of this patent is extended or adjusted under 35 U.S.C. 154(b) by 1563 days.

(21) Appl. No.: 11/004,699

(22) Filed: Dec. 3, 2004

(65) Prior Publication Data

US 2005/0171917 A1     Aug. 4, 2005

Related U.S. Application Data

(63) Continuation of application No. 09/711,578, filed on Nov. 13, 2000.

(51) Int. Cl.
*G06Q 20/00* (2012.01)
(52) U.S. Cl. .................. 705/80; 705/50; 705/51; 705/1
(58) Field of Classification Search ............... 705/80, 705/50, 51, 1
See application file for complete search history.

(56) References Cited

U.S. PATENT DOCUMENTS

| 3,573,747 | A | 4/1971 | Adams et al. |
| 3,581,072 | A | 5/1971 | Nymeyer |
| 4,412,287 | A | 10/1983 | Braddock |
| 4,674,044 | A | 6/1987 | Kalmus et al. |
| 4,677,552 | A | 6/1987 | Sibley |
| 4,789,928 | A | 12/1988 | Fujisaki |
| 4,799,156 | A | 1/1989 | Shavit et al. |
| 4,823,265 | A | 4/1989 | Nelson |
| 4,903,201 | A | 2/1990 | Wagner |
| 5,063,507 | A | 11/1991 | Lindsey et al. |
| 5,077,665 | A | 12/1991 | Silverman et al. |
| 5,101,353 | A | 3/1992 | Lupien et al. |
| 5,136,501 | A | 8/1992 | Silverman et al. |
| 5,168,446 | A | 12/1992 | Wiseman |
| 5,205,200 | A | 4/1993 | Wright |
| 5,243,515 | A | 9/1993 | Lee |
| 5,258,908 | A | 11/1993 | Hartheimer et al. |
| 5,280,422 | A | 1/1994 | Moe et al. |
| 5,297,031 | A | 3/1994 | Gutterman et al. |
| 5,297,032 | A | 3/1994 | Trojan et al. |

(Continued)

FOREIGN PATENT DOCUMENTS

| CA | 2253543 | 3/1997 |
| FR | 2658635 | 8/1991 |

(Continued)

OTHER PUBLICATIONS

Web page from www.ebay.com dated Nov. 1999.

(Continued)

*Primary Examiner* — Pierre E Elisca
(74) *Attorney, Agent, or Firm* — Schwegman Lundberg, & Woessner, P.A.

(57) ABSTRACT

A conflict or dispute between at least two parties is managed to reflect the cultural context of the parties. When the party is from a low context culture, conflict management assumes the party prefers to adopt a transactional viewpoint and to select from a set of possible resolutions. When the party is from a high context culture, dispute resolution assumes the party prefers to view the dispute as part of a relationship and to be advised as to appropriate actions. A system bridges between the cultural contexts of the parties by collecting and providing information in accordance with the preferred procedure of each party.

59 Claims, 3 Drawing Sheets

U.S. PATENT DOCUMENTS

| | | | |
|---|---|---|---|
| 5,305,200 A | 4/1994 | Hartheimer et al. | |
| 5,325,297 A | 6/1994 | Bird et al. | |
| 5,329,589 A | 7/1994 | Fraser et al. | |
| 5,375,055 A | 12/1994 | Togher et al. | |
| 5,394,324 A | 2/1995 | Clearwater | |
| 5,426,281 A | 6/1995 | Abecassis | |
| 5,553,145 A | 9/1996 | Micali | |
| 5,640,569 A | 6/1997 | Miller et al. | |
| 5,664,115 A | 9/1997 | Fraser | |
| 5,689,652 A | 11/1997 | Lupien et al. | |
| 5,710,889 A | 1/1998 | Clark et al. | |
| 5,715,402 A | 2/1998 | Popolo | |
| 5,717,989 A | 2/1998 | Tozzoli et al. | |
| 5,727,165 A | 3/1998 | Ordish et al. | |
| 5,790,790 A | 8/1998 | Smith et al. | |
| 5,794,207 A | 8/1998 | Walker et al. | |
| 5,794,219 A | 8/1998 | Brown | |
| 5,818,914 A | 10/1998 | Fujisaki | |
| 5,825,896 A | 10/1998 | Leedom | |
| 5,826,244 A | 10/1998 | Huberman | |
| 5,835,896 A | 11/1998 | Fisher et al. | |
| 5,845,265 A | 12/1998 | Woolston | |
| 5,845,266 A | 12/1998 | Lupien et al. | |
| 5,850,442 A | 12/1998 | Muftic | |
| 5,878,139 A | 3/1999 | Rosen | |
| 5,895,450 A | 4/1999 | Sloo | |
| 6,047,264 A | 4/2000 | Fisher et al. | |
| 6,061,448 A | 5/2000 | Smith et al. | |
| 6,085,176 A | 7/2000 | Woolston | |
| 6,119,137 A | 9/2000 | Smith et al. | |
| 6,178,408 B1 | 1/2001 | Copple et al. | |
| 6,192,407 B1 | 2/2001 | Smith et al. | |
| 6,202,051 B1 | 3/2001 | Woolston | |
| 6,243,691 B1 | 6/2001 | Fisher et al. | |
| 6,336,095 B1 | 1/2002 | Rosen | |
| 6,415,264 B1 | 7/2002 | Walker et al. | |
| 6,415,270 B1 | 7/2002 | Rackson et al. | |
| 6,535,856 B1 | 3/2003 | Tal | |
| 6,553,347 B1* | 4/2003 | Shevchenko et al. | 705/14.25 |
| 6,556,974 B1* | 4/2003 | D'Alessandro | 705/10 |
| 6,587,838 B1 | 7/2003 | Esposito et al. | |
| 6,598,026 B1 | 7/2003 | Ojha et al. | |
| 6,766,307 B1 | 7/2004 | Israel et al. | |
| 6,850,918 B1 | 2/2005 | Burchetta et al. | |
| 6,856,984 B2 | 2/2005 | Slaikeu | |
| 6,954,741 B1 | 10/2005 | Burchetta et al. | |
| 7,020,634 B2 | 3/2006 | Khaishgi et al. | |
| 7,401,025 B1 | 7/2008 | Lokitz | |
| 7,630,904 B2 | 12/2009 | Vaidyanathan et al. | |
| 7,774,276 B1 | 8/2010 | Leonardo et al. | |
| 7,870,066 B2 | 1/2011 | Lin et al. | |
| 7,877,278 B1 | 1/2011 | Leonardo et al. | |
| 8,209,228 B2 | 6/2012 | Leonardo et al. | |
| 2001/0034635 A1 | 10/2001 | Winters et al. | |
| 2001/0041993 A1 | 11/2001 | Campbell | |
| 2001/0047332 A1 | 11/2001 | Gonen-Friedman et al. | |
| 2001/0053967 A1 | 12/2001 | Gordon et al. | |
| 2002/0007283 A1 | 1/2002 | Anelli | |
| 2002/0007362 A1 | 1/2002 | Collins et al. | |
| 2002/0010591 A1 | 1/2002 | Pomerance | |
| 2002/0010634 A1 | 1/2002 | Roman et al. | |
| 2002/0035528 A1 | 3/2002 | Simpson et al. | |
| 2002/0059130 A1 | 5/2002 | Cheng et al. | |
| 2002/0069182 A1 | 6/2002 | Dwyer | |
| 2002/0143711 A1 | 10/2002 | Nassiri | |
| 2002/0147604 A1 | 10/2002 | Slate, II et al. | |
| 2002/0198830 A1 | 12/2002 | Randell et al. | |
| 2003/0212891 A1* | 11/2003 | Evans et al. | 713/168 |
| 2004/0044586 A1 | 3/2004 | Gullo | |
| 2004/0059596 A1 | 3/2004 | Vaidyanathan et al. | |
| 2004/0128155 A1* | 7/2004 | Vaidyanathan et al. | 705/1 |
| 2004/0148234 A1 | 7/2004 | Gonen-Friedman et al. | |
| 2004/0267559 A1 | 12/2004 | Hinderer et al. | |
| 2005/0125340 A1 | 6/2005 | Lin et al. | |
| 2005/0171917 A1 | 8/2005 | Femenia et al. | |
| 2005/0246268 A1 | 11/2005 | Foran et al. | |
| 2005/0289039 A1 | 12/2005 | Greak | |
| 2006/0031177 A1 | 2/2006 | Rule | |
| 2008/0307066 A1* | 12/2008 | Amidon et al. | 709/217 |
| 2010/0100483 A1 | 4/2010 | Lin et al. | |
| 2010/0268624 A1 | 10/2010 | Leonardo et al. | |
| 2011/0106661 A1 | 5/2011 | Leonardo et al. | |
| 2012/0253854 A1 | 10/2012 | Leonardo et al. | |

FOREIGN PATENT DOCUMENTS

| | | |
|---|---|---|
| NL | 9300266 | 2/1993 |
| WO | WO-9215174 | 9/1992 |
| WO | WO-9634356 | 10/1996 |
| WO | WO-9737315 | 10/1997 |
| WO | WO-2004111774 A3 | 12/2004 |

OTHER PUBLICATIONS

"International Search Report, Application No. PCT/US04/17641, date mailed Mar. 28, 2005", 10 Pages.

Arsenault, Lisa, "Web Wise", *Canadian Insurance.* 103(9), (Aug. 1998),6 Pages.

Baumann, G. W., "Personal Optimized Decision/Transaction Technical Program", *IBM Technical Disclosure Bulltetin*, (Jan. 1995),83-84.

Business Editors/Computer Writer, "Onsale: Onsale Brings Thrill of Auctions and Bargain Hunting Online; Unique Internet retail service debuts with week-long charity auction for The Computer Museum in Boston", *Business Wire*, (May 24, 1995),3 pages.

Clemons, E, "Evaluating the prospects for alternative electronic securities", *Proceedings of ICIS 91: 12th International Conference on Information Systems*, (Dec. 16-18, 1991),53-61.

Computer Reseller News, "Onsale Joins Fray as Online Shopping Picks Up Speed: Internet Booms", *Computer Reseller News*, (Jun. 5, 1995),73.

Graham, I, "The Emergence of Linked Fish Markets in Europe", *EM—Electronic Commerce in Europe, EM—Electronic Markets*, 8(2), (Jul. 1998),29-32.

Hauser, R, "Anonymous Delivery of Goods in Electronic Commerce", *IBM Technical Disclosure Bulletin*, 39(3). (Mar. 1996),363-366

Hess, C M., "Computerized Loan Organization System: An Industry Case Study of the Electronic Markets Hypothesis", *MIS Quarterly*, 18(3), (Sep. 1994),251-274.

Kandra, Anne, "Consumer Watch: Resolutions for Smart Buyers", *PC World magazine*, 19(1), (Jan. 2001),27-30

Klein, Stefan, "Introduction to Electronic Auctions", *EM—Electronic Auctions, EM—Electronic Markets*, vol. 7, No. 4, (Dec. 1997),3-6.

Lee, H G., "AUCNET: Electronic Intermediary for Used-Car Transactions", *EM—Electronic Auctions. EM—Electronic Markets*, 7(4), (Dec. 1997),24-28.

Lee, H. G., "Electronic brokerage and electronic auction: the impact of IT on market structures", *Proceedings of thr Twenty-Ninth Hawaii International Conference on System Sciences*, vol. 4, (Jan. 3-6, 1996),397-408.

Malone, Thomas W., et al., "Electronic Markets and Electronic Hierarchies", *Communications of the ACM*. 30(6), (Jun. 1987),484-497.

Mardesich, Jodi, "Site Offers Clearance for End-of-Life Products—Onsale Takes Auction Gavel Electronic", *Computer Reseller News*, (Jul. 8, 1996),2 pages.

Massimb, Marcel, "Electronic Trading, Market Structure and Liquidity", *Financial Analysts Journal*, 50(1), (Jan./Feb. 1994),39-50.

Neo, Boon S., "The implementation of an electronic market for pic trading in Singapore", *Journal of Strategic Information Systems*, 1(5), (Dec. 1992),278-288.

Post, D L., "Application of auctions as a pricing mechanism for the interchange of electric power", *IEEE Transactions on Power Systems*, 10(3), (Aug. 1995), 1580-1584.

Reck, Martin, "Formally specifying an automated trade execution system", *Journal of Systems and Software*. 21(3), (Jun. 1993),245-252.

Reck, Martin, "Trading-Process Characteristics Electronic Auctions", *EM—Electronic Auctions, EM—Electronic Markets*, 7(4), Focus Theme,(Dec. 1997),17-23.

Rockoff, Todd , et al., "Design of an Internet-based system for remote Dutch auctions", *Internet Research: Electronic Networking Applications and Policy*, 5(4), (Jan. 1, 1995),10-16.

Rule, Colin, "Online Dispute Resolution for Business—B2B, E-Commerce Consumer, Employment, Insurance, and Other Commercial Conflicts", *Online Dispute Resolution for Business, Jossey-Bass, A Wiley Imprint*, (2002),1-326.

Schmid, B F., "Electronic Markets—The Development of Electronic Commerce, Electronic Markets", *Newsletter of the Competence Centre. EM—The Development of Electronic Commerce, Electronic Markets*, 9/10, No. 9/10,(Oct. 1993),3-4

Siegmann, Ken , "Nowhere to Go but Up", *PC Week*, 12(42), (Oct. 23, 1995),A5(1), 1-3.

Tjostheim, Ingvar , "A case study of an on-line auction for the World Wide Web", *Norwegian Computing Center (NR)*, (1997),1-10.

Turban, E , "Auctions and Bidding on the Internet: An Assessment", *EM—Electronic Auction, EM—Electronic Markets*, 7(4), (Dec. 1997),7-11.

Van Heck, E , "Experiences with Electronic Auctions in the Dutch Flower Industry", *EM—Electronic Auctions. EM—Electronic Markets*, 7(4), Focus Theme,(1997),29-34.

Warbelow, A , et al., "Aucnet: TV Auction Network System", *Harvard Business School of Case/Study*, HBVR#9-190-001, (Apr. 1996),1-16.

Zwass, Vladimir , "Electronic Commerce: Structures and Issues", *International Journal of Electronic Commerce*, 1(1), (Fall 1996),3-23.

U.S. Appl. No. 09/583,216, 312 Amendment mailed Nov. 1, 2010, 11 pgs.

U.S. Appl. No. 09/583,216, Advisory Action mailed Jan. 8, 2009, 3 pgs.

U.S. Appl. No. 09/583,216, Advisory Action mailed Jan. 14, 2004, 2 pgs.

U.S. Appl. No. 09/583,216, Advisory Action mailed Jul. 7, 2005, 4 pgs.

U.S. Appl. No. 09/583,216, Appeal Brief filed Jul. 11, 2005, 20 pgs.

U.S. Appl. No. 09/583,216, Final Office Action mailed Mar. 11, 2005, 7 pgs.

U.S. Appl. No. 09/583,216, Final Office Action mailed Oct. 3, 2008, 14 pgs.

U.S. Appl. No. 09/583,216, Final Office Action mailed Oct. 10, 2003, 14 pgs.

U.S. Appl. No. 09/583,216, Non Final Office Action mailed Mar. 16, 2010, 15 pgs.

U.S. Appl. No. 09/583,216, Non Final Office Action mailed May 6, 2004, 14 pgs.

U.S. Appl. No. 09/583,216, Non-Final Office Action mailed Feb. 15, 2008, 12 pgs.

U.S. Appl. No. 09/583,216, Non-Final Office Action mailed Apr. 17, 2009, 13 pgs.

U.S. Appl. No. 09/583,216, Notice of Allowance mailed Aug. 18, 2010, 4 pgs.

U.S. Appl. No. 09/583,216, Preliminary Amendment filed Oct. 31, 2007, 13 pgs.

U.S. Appl. No. 09/583,216, PTO Response to 312 Amendment mailed Dec. 23, 2010, 2 pgs.

U.S. Appl. No. 09/583,216, Response filed May 11, 2005 to Final Office Action mailed Mar. 11, 2005, 6 pgs.

U.S. Appl. No. 09/583,216, Response filed Jun. 11, 2010 to Non Final Office Action mailed Mar. 16, 2010, 9 pgs.

U.S. Appl. No. 09/583,216, Response filed Jun. 16, 2008 to Non Final Office Action mailed Feb. 15, 2008, 11 pgs.

U.S. Appl. No. 09/583,216, Response filed Jul. 14, 2003 to Non Final Office Action mailed Apr. 14, 2003, 10 pgs.

U.S. Appl. No. 09/583,216, Response filed Sep. 17, 2009 to Non Final Office Action mailed Apr. 17, 2009, 9 pgs.

U.S. Appl. No. 09/583,216, Response filed Nov. 8, 2004 to Non Final Office Action mailed May 6, 2004, 2 pgs.

U.S. Appl. No. 09/583,216, Response filed Dec. 3, 2008 to Final Office Action mailed Oct. 3, 2008, 17 pgs.

U.S. Appl. No. 09/711,578, Appeal Brief filed Aug. 3, 2006, 18 pgs.

U.S. Appl. No. 09/711,578, Appeal Brief filed Oct. 27, 2004, 19 pgs.

U.S. Appl. No. 09/711,578, Decision on Appeal Brief mailed Dec. 11 2008, 11 pgs.

U.S. Appl. No. 09/711,578, Final Office Action mailed Jan. 10, 2006, 8 pgs.

U.S. Appl. No. 09/711,578, Final Office Action mailed Apr. 23, 2004, 7 pgs.

U.S. Appl. No. 09/711,578, Final Office Action mailed Jun. 27, 2012, 8 pgs.

U.S. Appl. No. 09/711,578, Non Final Office Action mailed Jan. 7, 2005, 7 pgs.

U.S. Appl. No. 09/711,578, Non Final Office Action mailed Jul. 15, 2005, 8 pgs.

U.S. Appl. No. 09/711,578, Non Final Office Action mailed Sep. 8, 2003, 7 pgs.

U.S. Appl. No. 09/711,578, Response filed Feb. 9, 2004 to Non Final Office Action mailed Sep. 8, 2003, 6 pgs.

U.S. Appl. No. 09/711,578, Response filed May 9, 2005 to Non Final Office Action mailed Jan. 7, 2005, 7 pgs.

U.S. Appl. No. 09/711,578, Response filed Sep. 23, 2004 to Final Office Action mailed Apr. 23, 2004, 5 pgs.

U.S. Appl. No. 09/711,578, Response filed Oct. 17, 2005 to Non Final Office Action mailed Jul. 15, 2005, 8 pgs.

U.S. Appl. No. 09/717,433, Advisory Action mailed Oct. 16, 2007, 3 pgs.

U.S. Appl. No. 09/717,433, Final Office Action mailed May 8, 2007, 7 pgs.

U.S. Appl. No. 09/717,433, Final Office Action mailed Sep. 8, 2008, 8 pgs.

U.S. Appl. No. 09/717,433, Final Office Action mailed Sep 18, 2009, 13 pgs.

U.S. Appl. No. 09/717,433, Final Office Action mailed Nov. 18, 2003, 4 pgs.

U.S. Appl. No. 09/717,433, Non Final Office Action mailed May 2, 2006, 8 pgs.

U.S. Appl. No. 09/717,433, Non Final Office Action mailed May 4, 2005, 4 pgs.

U.S. Appl. No. 09/717,433, Non Final Office Action mailed Jun. 3, 2003, 13 pgs.

U.S. Appl. No. 09/717,433, Non Final Office Action mailed Oct. 18, 2006, 8 pgs.

U.S. Appl. No. 09/717,433, Non Final Office Action mailed Nov. 8, 2004, 4 pgs.

U.S. Appl. No. 09/717,433, Non-Final Office Action mailed Feb. 5, 2009, 13 pgs.

U.S. Appl. No. 09/717,433, Non-Final Office Action mailed Feb 6, 2008, 9 pgs.

U.S. Appl. No. 09/717,433, Notice of Allowance mailed Apr. 1, 2010, 14 pgs.

U.S. Appl. No. 09/717,433, Pre-Appeal Brief Request for Review filed Aug. 8, 2007, 5 pgs.

U.S. Appl. No. 09/717,433, Response filed Jan. 18, 2007 to Non Final Office Action mailed Oct. 18, 2006, 7 pgs.

U.S. Appl. No. 09/717,433, Response filed Feb. 8, 2005 to Non Final Office Action mailed Nov. 8, 2004, 10 pgs.

U.S. Appl. No. 09/717,433, Response filed Jun. 3, 2009 to Non Final Office Action mailed Feb. 5, 2009, 17 pgs.

U.S. Appl. No. 09/717,433, Response filed Jun. 5, 2008 to Non-Final Office Action mailed Feb. 6, 2008, 13 pgs.

U.S. Appl. No. 09/717,433, Response filed Jul. 9, 2007 to Final Office Action mailed May 8, 2007, 7 pgs.

U.S. Appl. No. 09/717,433, Response filed Aug. 1, 2005 to Non Final Office Action mailed May 4, 2005, 4 pgs.

U.S. Appl. No. 09/717,433, Response filed Aug. 2, 2006 to Non Final Office Action mailed May 2, 2006, 11 pgs.

U.S. Appl. No. 09/717,433, Response filed Sep. 2, 2003 to Non Final Office Action mailed Jun. 3, 2003, 11 pgs.

U.S. Appl. No. 09/717,433, Response filed Nov. 5, 2007 to Final Office Action mailed May 8, 2007, 14 pgs.

U.S. Appl. No. 09/717,433, Response filed Nov. 10, 2008 to Final Office Action mailed Sep. 8, 2008, 17 pgs.

U.S. Appl. No. 09/717,433, Response filed Dec. 18, 2009 to Final Office Action mailed Sep. 18, 2009, 13 pgs.

U.S. Appl. No. 10/837,224, Advisory Action mailed May 28, 2009, 3 pgs.
U.S. Appl. No. 10/837,224, Final Office Action mailed Feb. 4, 2009, 12 pgs.
U.S. Appl. No. 10/837,224, Non-Final Office Action mailed Jan. 10, 2008, 7 pgs.
U.S. Appl. No. 10/837,224, Notice of Allowance mailed Sep. 4, 2009, 12 pgs.
U.S. Appl. No. 10/837,224, Notice of Allowance mailed Sep. 8, 2010, 5 pgs.
U.S. Appl. No. 10/837,224, Response filed May 12, 2008 to Non-Final Office Action mailed Jan. 10, 2008, 18 pgs.
U.S. Appl. No. 10/837,224, Response filed Jun. 4, 2009 to Advisory Action mailed May 28, 2009, 13 pgs.
U.S. Appl. No. 10/837,224, Response filed Jun. 4, 2009 to Final Office Action mailed Feb. 4, 2009, 13 pgs.
U.S. Appl. No. 11/195,578, Advisory Action mailed Apr. 4, 2010, 4 pgs.
U.S. Appl. No. 11/195,578, Appeal Brief filed Jun. 18, 2010, 28 pgs.
U.S. Appl. No. 11/195,578, Final Office Action mailed Jan. 20, 2010, 30 pgs.
U.S. Appl. No. 11/195,578, Final Office Action mailed Feb. 16, 2011, 36 pgs.
U.S. Appl. No. 11/195,578, Non-Final Office Action mailed May 28, 2009, 23 pgs.
U.S. Appl. No. 11/195,578, Non-Final Office Action mailed Sep. 2, 2010, 29 pgs.
U.S. Appl. No. 11/195,578, Response filed Mar. 22, 2010 to Final Office Action mailed Jan. 20, 2010, 16 pgs.
U.S. Appl. No. 11/195,578, Response filed May 16, 2011 to Final Office Action mailed Feb. 16, 2011, 13 pgs.
U.S. Appl. No. 11/195,578, Response filed Sep. 28, 2009 to Non Final Office Action mailed May 28, 2009, 21 pgs.
U.S. Appl. No. 11/195,578, Response filed Dec. 2, 2010 to Non Final Office Action mailed Sep. 2, 2010, 13 pgs.
U.S. Appl. No. 12/826,504, Non Final Office Action mailed Feb. 6, 2012, 9 pgs.
U.S. Appl. No. 12/826,504, Non Final Office Action mailed Jun. 28, 2011, 9 pgs.
U.S. Appl. No. 12/826,504, Response filed Jun. 6, 2012 to Non Final Office Action mailed Feb. 6, 2012, 7 pgs.
U.S. Appl. No. 12/826,504, Response filed Aug. 26, 2011 to Non Final Office Action mailed Jun. 28, 2011, 9 pgs.
U.S. Appl. No. 12/987,822, Non Final Office Action mailed Jul. 25, 2011, 5 pgs.
U.S. Appl. No. 12/987,822, Notice of Allowance mailed Mar. 1, 2012, 7 pgs.
U.S. Appl. No. 12/987,822, Response filed Oct. 25, 2011 to Non Final Office Action mailed Jul. 25, 2011, 9 pgs.
"Crash Shuts Down Ebay for Much of the Day", [Online]. Retrieved from the internet:<http://www.nytimes.com/1999/06/12/business/crash-shuts-down-ebay-for-much-of-the-day.html>, (Jun. 12, 1999), 2 pgs.
"eBay Website", [Online]. Retrieved from the Internet: <URL: http://web.archive.org/web/19991014023408/http://www.ebay.com/index.html>, (Archived Oct. 14, 1999), 31 pgs.
"Holiday e-Shoppers to Get Double Assurance as Two Consumer Groups Partner to Promote Safer Shopping On-line", PR Newswire, (Nov. 16, 2000), 2 pgs.
"Online Resolution Settles E-Commerce, Business and Insurance Disputes Online Without Going to Court", PR Newswire, (Nov. 8, 2000), 1 pg.
"SquareTrade's online dispute resolution process: step by step", [Online]. Retrieved from the Internet: <URL: http://web.archive.org/web/20000510210634/http://www.squaretrade.com/learnmore/learnmore_process on.cfm>, (Archived May 10, 2000), 1 pg.
"The Feedback Forum", eBay, [Online]. Retrieved from the Internet: <URL: http://web.archive.org/web/19990117033159/pages.ebay.com/aw/index.html>, (Archived Jan. 16, 1999), 7 pgs.
"The Feedback Forum: FAQ", eBay, [Online]. Retrieved from the Internet: <URL: http://web.archive.org/web/19991012230420/pages.ebay.com/help/basics/f-feedback.html>, (Archived Oct. 12, 1999), 4 pgs.
"UAUTOBID.com, Inc. Introduces the Capability to Purchase Specific Vehicles Online", Business Wire, (Sep. 13, 1999), 1 pg.
Girard, Kim, "Ebay Waives Fees after Major Outage", [Online]. Retrieved from the Internet:<http://news.cnet.com/21 00-1017-227050.html>, (Jun. 14, 1999), 6 pgs.
U.S. Appl. No. 09/711,578, Pre Appeal Brief Request for Review filed Sep. 27, 2012, 5 pgs.
U.S. Appl. No. 09/711,578, Advisory Action mailed Sep. 13, 2012, 2 pgs.
U.S. Appl. No. 09/711,578, Response filed Aug. 22, 2012 to Non Final Office Action mailed Jun. 27, 2012, 10 pgs.
U.S. Appl. No. 12/638,938, Non Final Office Action mailed Oct. 10, 2012, 7 pgs.

* cited by examiner

AUTOMATED CROSS-CULTURAL CONFLICT MANAGEMENT

This application is a continuation of U.S. Ser. No. 09/711,578, filed on Nov. 13, 2000, which is incorporated herein by reference.

BACKGROUND OF THE INVENTION

The present invention relates to alternative dispute resolution, and more particularly, is directed to a fully automated system and method for facilitating negotiation of a conflict between at least two parties.

Alternative dispute resolution encompasses techniques by which disputants privately resolve a disagreement without using the public justice system. An impartial or neutral third party often participates, either as an arbitrator or mediator. An arbitrator hears the stories presented by the respective disputants, and renders a decision. A mediator hears the stories presented by the respective disputants, and helps the parties come to an agreement.

However, participation of the third party can be expensive. Additionally, if the disputants have substantially different cultural backgrounds, then this difference can be a source of misunderstanding. If a third party shares the cultural background of one party, but not the other, then the resolution may be unfair due to lack of cultural sensitivity.

Automated systems exist for resolving conflicts. However, the conventional systems usually assume that a human is directing the dispute resolution, and assume all parties have the same cultural context.

Accordingly, there is a need for a low-cost, culturally sensitive solution to the problem of managing conflict resolution between disputants having different cultural backgrounds.

SUMMARY OF THE INVENTION

In accordance with an aspect of this invention, there are provided a method of and a system for managing a dispute. Information relating to the dispute is automatically received from one of an initiator and a respondent, and portions of the information are iteratively provided to the other of the initiator and the respondent in accordance with predetermined criteria.

According to a further aspect of the invention, the received information includes at least one factor and an evaluation of the desirability or cost of the factor. In some cases, the at least one factor includes at least two of historical harm, future harm, an incentive, a punishment, a request, an offer, and a desired outcome.

According to a further aspect of the invention, factors relating to the dispute are iteratively received from the other of the initiator and the respondent, and evaluations of the desirability or cost of the portions of iteratively provided information are iteratively received from the other of the initiator and the respondent.

According to a further aspect of the invention, an agreement to resolve the dispute is automatically proposed based on the received information; factors relating to the dispute received from the other of the initiator and the respondent; and an evaluation of desirability from the initiator or the respondent and an evaluation of cost from the other of the initiator or the respondent, the evaluations being associated with the same portion of the dispute related information or the same dispute related factor.

It is not intended that the invention be summarized here in its entirety. Rather, further features, aspects and advantages of the invention are set forth in or are apparent from the following description and drawings.

DETAILED DESCRIPTION OF THE PREFERRED EMBODIMENTS

A conflict or dispute between at least two parties is managed to reflect the cultural context of the parties. When the party is from a low context culture, conflict management assumes the party prefers to adopt a transactional viewpoint and to select from a set of possible resolutions. When the party is from a high context culture, dispute resolution assumes the party prefers to view the dispute as part of a relationship and to be advised as to appropriate actions. A system bridges between the cultural contexts of the parties by collecting and providing information in accordance with the culturally preferred procedure of each party.

An advantage of the present system is that each party perceives it as user-friendly. Another advantage of the present system is that agreements reached using the present system are perceived as fair, since each party has the opportunity to relate the agreement to its cultural context according to its own preferences.

Figure 1:
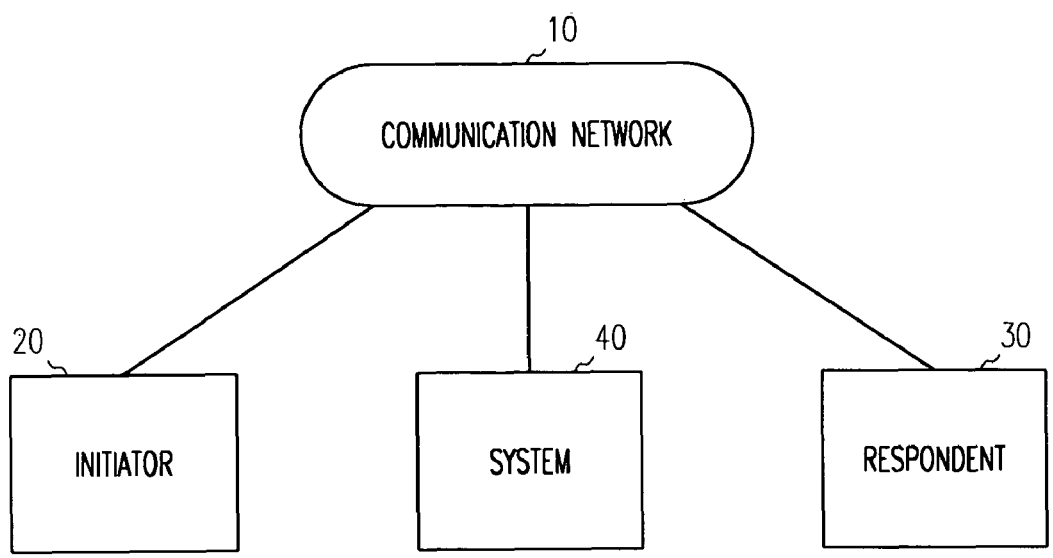
FIG. 1 is a block diagram showing the environment in which the present invention is applied.

Referring now to the drawings, and in particular to FIG. 1, there is illustrated an environment in which the present invention is applied. FIG. 1 shows initiator 20, respondent 30 and system 40 respectively coupled to communication network 10. In one embodiment, each of initiator 20 and respondent 30 is represented by a general purpose personal computer having e-mail and a browser program, such as Netscape or Explorer, for Internet access, system 40 is a general purpose computer programmed to serve web pages, and send and receive e-mail as described below, and network 10 is the Internet. The actual communication links may use wireline or wireless lines. In another embodiment, instead of personal computers, intelligent handheld devices or the like are used.

Figure 2:
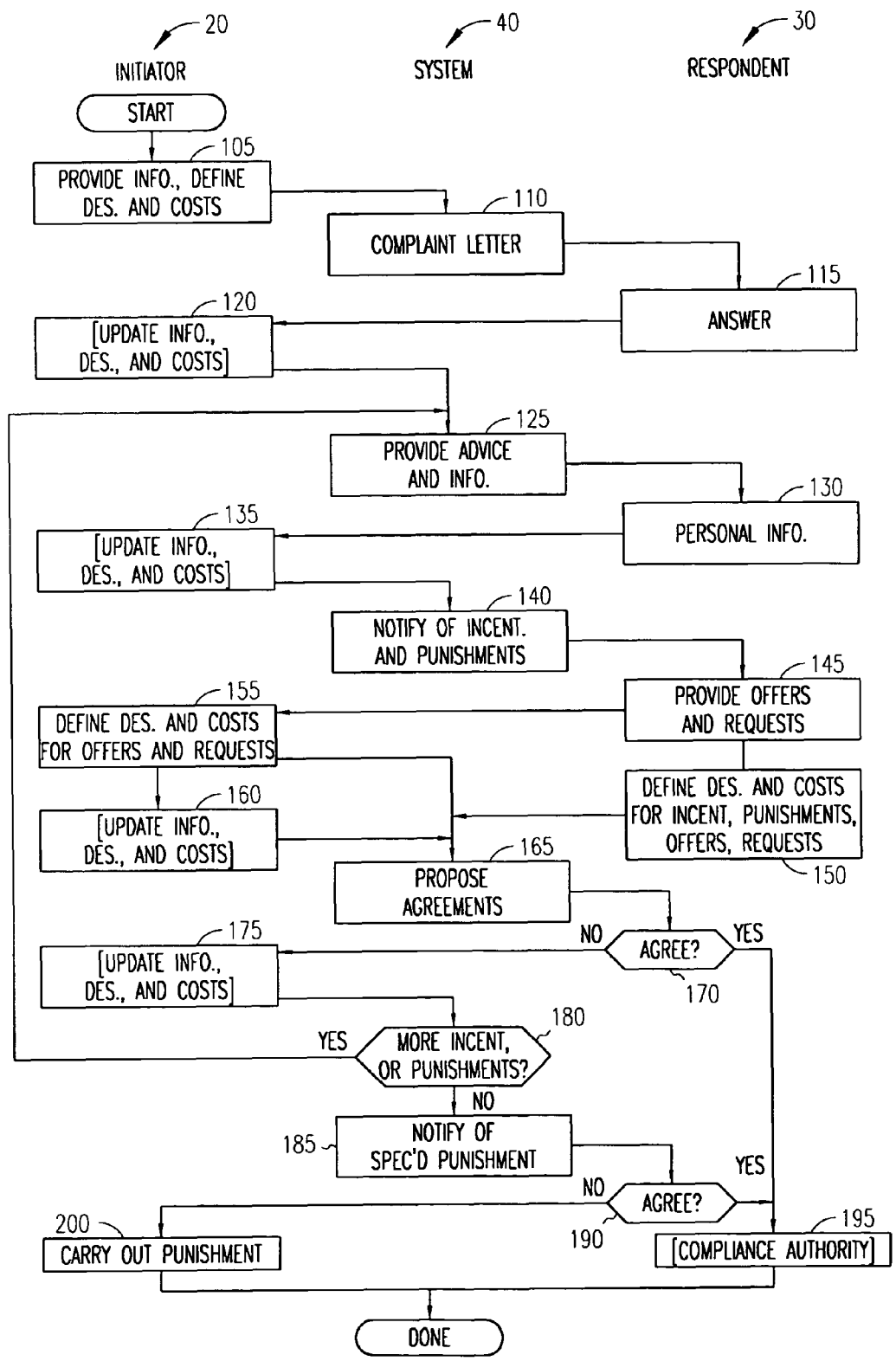
FIGS. 2 and 3 are flowcharts showing embodiments of conflict management according to the present invention.

FIG. 2 depicts a flowchart for an embodiment assuming that initiator 20 is from a low context culture and respondent 30 is from a high context culture. People from low context cultures tend to place high value on individual choices and will focus on a transaction by itself, while people from high context cultures tend to want to do the right thing for the community and will consider a transaction as part of a relationship.

Let it be assumed that the initiator and respondent entered into a contract for initiator to deliver an item to respondent after an initial partial payment and then to accept remaining payments according to a schedule. Misunderstandings may have begun already. Generally, the low context culture initiator will assume that performance will be provided in a tit-for-tat manner according to the contract. However, the high context culture respondent will probably see this contract as the start of a relationship; since a delayed payment schedule is provided, the respondent will interpret this as an opportunity to "play with" the relationship. More particularly, if the initiator is not nurturing the relationship on an on-going basis, the respondent may withhold payment in retaliation for withholding of attention by the initiator. Meanwhile, since on-going attention was not explicitly part of the contract, the initiator may be utterly unaware that the respondent feels short-changed. Let it be further assumed that respondent 30 has not paid according to the payment schedule, and initiator 20 is using system 40 to resolve the payment dispute.

Since initiator 20 is from a low context culture, system 40 obtains all the information from initiator 20 relating to the dispute at an initial time, reflecting the propriety of viewing the dispute as a transaction. The information comprises factors relating to the dispute and the initiator's portion of a rating of the information. As the conflict resolution progresses, system 40 provides opportunities to initiator 20 to update its information in response to new information from respondent 30.

Since respondent 30 is from a high context culture, system 40 provides information to respondent 30 in a way that paints a picture around respondent 30 and enables respondent 30 to contribute to the picture. That is, system 40 provides portions of the initiator's information in an iterative manner, interspersing facts, feelings and future directions, while soliciting similar information from respondent 30, reflecting the propriety of viewing the dispute as part of an on-going relationship that is strengthened by the disputants working together. System 40 uses predetermined criteria for deciding which iteration should reveal which portion of the initiator's information. System 40 automatically advises respondent 30 as to its overall situation.

During each iteration, system 40 assembles the initiator's and respondent's portions of the rating of at least one factor. Generally, a factor is an incentive or a punishment, based on whether the recipient is expected to want or avoid the factor. A factor may also be a desired outcome for the instant dispute, or actual or expected harm resulting from non-performance of the contract. When the factor relates to something experienced by or to be provided by a party, the rating is referred to as a "cost". When the factor relates to something that a party wants, the rating is referred to as a "desirability". The full rating for a factor comprises its cost and desirability. For this example, each of "cost" and "desirability" can assume one of three values: "low", "medium", and "high". In other embodiments, cost and desirability may assume continuous or discrete values, and may differ by factor.

An example of predetermined criteria for iteratively providing information to the respondent is to provide factors a "high" desirability or cost rating on the first iteration, then factors having a "medium" desirability or cost rating on the second iteration, then factors having a "low" desirability or cost rating on the third iteration Other criteria may be to provide factors having a rating equal to a predetermined threshold, when factors have been assigned numerical ratings, or to provide a certain number of factors at each iteration. Other criteria and variations thereof will be apparent to one of ordinary skill.

During each iteration, system 40 automatically proposes at least one agreement considering the full ratings of the factors of the agreement.

At step 105, initiator 20 provides information to system 40 including factors and the initiator's rating of the desirability or cost of the factors. Typically, initiator 20 provides the information through Internet web pages, but may alternatively fill out a paper form or provide the information via e-mail or use other suitable form of communication. System 40 then sorts the factors based on their rating. For this example, it is assumed that the negotiation will span, at most, three iterations, and the factors, if any, having one of the three ratings will be considered at each iteration.

Generally, the initiator's information includes the following types of information, each instance of which is referred to as a factor:

1. problem description—e.g., third and fourth payments not made according to schedule provided in contract of February 2000;
2. harms—historical, future, actions taken or contemplated to mitigate damages;
3. incentives to initiator to continue relationship—e.g., diversity in client base, visibility of product in another country;
4. incentives to respondent to continue relationship—e.g., will extend credit in a future deal, will serve as a recommendation, will provide introductions, will co-market respondent's product, will invite respondent to a special conference, will provide additional training to respondent, will include respondent in design group for next generation of product, will schedule monthly status checks;
5. punishments to respondent for not resolving instant dispute—e.g., bad media publicity, complaint letter to community organization such as Chamber of Commerce, local lawsuit, mandatory arbitration in New York City, repossess item, find new trading partner. In some cases, initiator 20 may specify a punishment that will occur if an agreement is not reached (see step 185);
6. community of respondent—companies and people in business field and in geographical location of respondent. System 40 offers to search Internet databases and possibly other databases, such as Dun & Bradstreet, to locate relevant community information. In some cases, initiator 20 reviews the results of the search and selects appropriate information;
7. personal information about initiator: hopes when contract entered, embarrassment or lost opportunities relating to harm, hopes for future relationship; and
8. desired resolution: at least one acceptable outcome.

System 40 encourages initiator 20 to provide at least one factor for each type of information. Then, system 40 enables initiator 20 to provide its portion of the rating for each factor. In some embodiments, system 40 provides a default rating that initiator 20 may override. Cost ratings, that is, one of (low, medium, high), are provided for harms, punishments and selected personal information. Desirability ratings, that is, one of (low, medium, high), are provided for incentives, desired resolutions and the remaining personal information.

As part of the community information, initiator 20 may specify a compliance authority, that is, a party to whom an agreement should be reported. The compliance authority will also receive notice of performance or non-performance under the dispute resolution agreement. It is expected that respondent 30 will be motivated by the visibility of its actions to the compliance authority.

At step 110, system 40 prepares a complaint letter for respondent 30 based on the information provided by initiator 20 at step 105. Typically, system 40 sends the complaint letter to respondent 30 via e-mail, but may alternatively direct respondent 30 to an Internet web page, provide a voice message or use other suitable form of communication.

At step 115, respondent 30 provides an answer to the complaint letter, providing reasons why the promised performance did not occur. Examples might include a fire at the respondent's factory, non-payment of the respondent's accounts receivable, malfunctioning of the initiator's product and so on.

System 40 forwards the answer information to initiator 20, and at step 120, initiator 20 has the opportunity to update its previously provided information in response to the new information from respondent 30. More specifically, facts may exist that initiator 20 had been unaware of, and which are proper reasons for non-performance according to a low context culture that typically strictly construes contracts, and so initiator 20 will update its information, possibly eliminating the reasons for non-performance. On the other hand, respondent 30 may lie or use excuses for non-performance as its way of asserting its position in the relationship, and in this case, initiator 20 need not update its information, relying on system 40 to manage the dispute.

In a modification, at step 130, initiator 20 may set a delay timer to suspend negotiations. During the suspension period, initiator 20 may correct problems reported by respondent 30 or take other actions.

At step 125, system 40 advises respondent 30 that this dispute must be attended to. In this manner, system 40 acts as a representative of the community conscience on behalf of initiator 20. Also at step 125, system 40 provides initiator's personal information having a rating of "high" desirability or "high" cost. At step 130, system 40 elicits corresponding personal information from respondent 30, such as through a questionnaire on a web page. System 40 forwards the respondent's personal information to initiator 20, and at step 135, initiator 20 has the opportunity to update its previously provided information in response to the new information from respondent 30.

At step 140, system 40 provides initiator's incentive and punishment factors having a rating of "high" desirability or "high" cost to respondent 30. At step 145, system 40 elicits offers and requests relating to the continuing relationship from respondent 30, such as through a questionnaire on a web page. Then, at step 150, system 40 elicits the respondent's desirability and cost rankings for the initiator's factors and the offers and requests just supplied by respondent 30. System 40 forwards the respondent's offer and request factors to initiator 20, and at step 255, elicits the initiator's desirability and cost rankings for the respondent's offers and requests. At step 160, initiator 20 has the opportunity to update its previously provided information in response to the offers and requests from respondent 30.

Examples of request factors from respondent 30 are: on-site service, extension of warranty, a new delayed payment schedule, more frequent status calls and so on. Examples of offer factors from respondent 30 are: a future purchase, introductions to local businesses, invitations to local business events and so on.

At step 165, system 40 proposes an agreement based on the full rankings for the factors considered in this iteration. In some embodiments, the harm already experienced by initiator 20, and the importance of the initiator's desired outcome are also considered by system 40 in arriving at a proposed agreement.

One technique for automatically generating a proposed agreement is to find factors having a full rating of (desirability=high, cost=low) and place them in the proposed agreement. Then system 40 counts the number of desirability factors for each disputant, and if the imbalance is more than one, system 40 adds another desirability factor to the smaller side, ranking the factors, in order of most preferable, as follows:
 (desirability=high, cost=medium)
 (desirability=high, cost=high)
 (desirability=medium, cost=low)
 (desirability=medium, cost=medium)
Other techniques may be used, for example, treating three medium desirability factors as equivalent to one high desirability factor. When the rankings are quasi-continuous (e.g., a number between 1 and 100 or visually setting a slider bar between a left endpoint and a right endpoint), a formula may be employed. In some embodiments, a disputant may specify a factor as required for an acceptable agreement.

System 40 assumes that initiator 20, having a low context viewpoint, mainly cares about getting its desired outcome. Accordingly, any agreement approved by respondent 30 that includes the desired outcome is assumed to be acceptable. In other embodiments, system 40 may provide an opportunity for initiator 20 to review the agreement before assuming it is satisfactory.

At step 170, system 40 presents its proposed agreement to respondent 30. If respondent 30 accepts the agreement, then at step 195, system 40 reminds initiator 20 to report the agreement to a compliance authority, if any, and processing is completed.

If, at step 170, respondent 30 did not accept the agreement, then system 40 forwards the proposed rejected agreement to initiator 20, and at step 175, initiator 20 has the opportunity to update its previously provided information in response thereto.

In a modification, respondent 30 has the opportunity to adjust the factors included in the proposed agreement to generate a revised agreement. In some cases, system 40 is able to evaluate the revised agreement on behalf of initiator 20, such as by checking whether the desired outcome is still present. In other cases, system 40 forwards the revised agreement to initiator 20 for consideration. In a further modification, initiator 20 has the opportunity to adjust the factors included in the revised agreement to generate a re-revised agreement.

In another embodiment, at step 175, initiator 20 can set a delay timer to suspend negotiations. While negotiations are suspended, initiator 20 may take actions such as contacting respondent 30 or members of the respondent's community, or implementing so-called punishments and so on.

At step 180, system 40 checks whether there are any incentive or punishment factors from initiator 20 remaining. It will be recalled that these factors were provided at step 105, and possibly updated or additional factors were provided at steps 120, 135, 160 and 175. If there are factors remaining, then system 40 returns to step 125 for another iteration of negotiation. In this example, in the second iteration, system 40 provides stronger advice to respondent 30, and provides the initiator's factors having a ranking of "medium" cost or desirability, and then elicits responses from respondent 30. If respondent 30 rejects the agreement proposed by system 40 at the second iteration, then a third iteration will similarly occur, wherein system 40 provides the initiator's factors having a ranking of "low" cost or desirability. In other embodiments, the number of iterations may be determined based on, e.g., how many factors respondent 30 provides at each iteration of step 45, or a rating of the proposed agreement by respondent 30 or other suitable criteria.

In some embodiments, the parties have the opportunity to adjust the factors included in the proposed agreement only after system 40 is not able to propose additional agreements.

If at step 180, system 40 determines that there are no unpresented factors from initiator 20, then at step 185, system 40 notifies respondent 30 of the specified punishment action that initiator 20 will take, and at step 190, system 40 provides respondent 30 with another opportunity to agree to one of the previously proposed agreements. In a modification, respondent 30 has the opportunity to adjust proposed agreements, or propose its own agreement at step 190. If an agreement is reached, system 40 proceeds to step 195. If an agreement is not reached, then at step 200, system 40 notifies initiator 20 that respondent 30 has been warned that the specified punishment will occur, and processing is complete.

Figure 3:
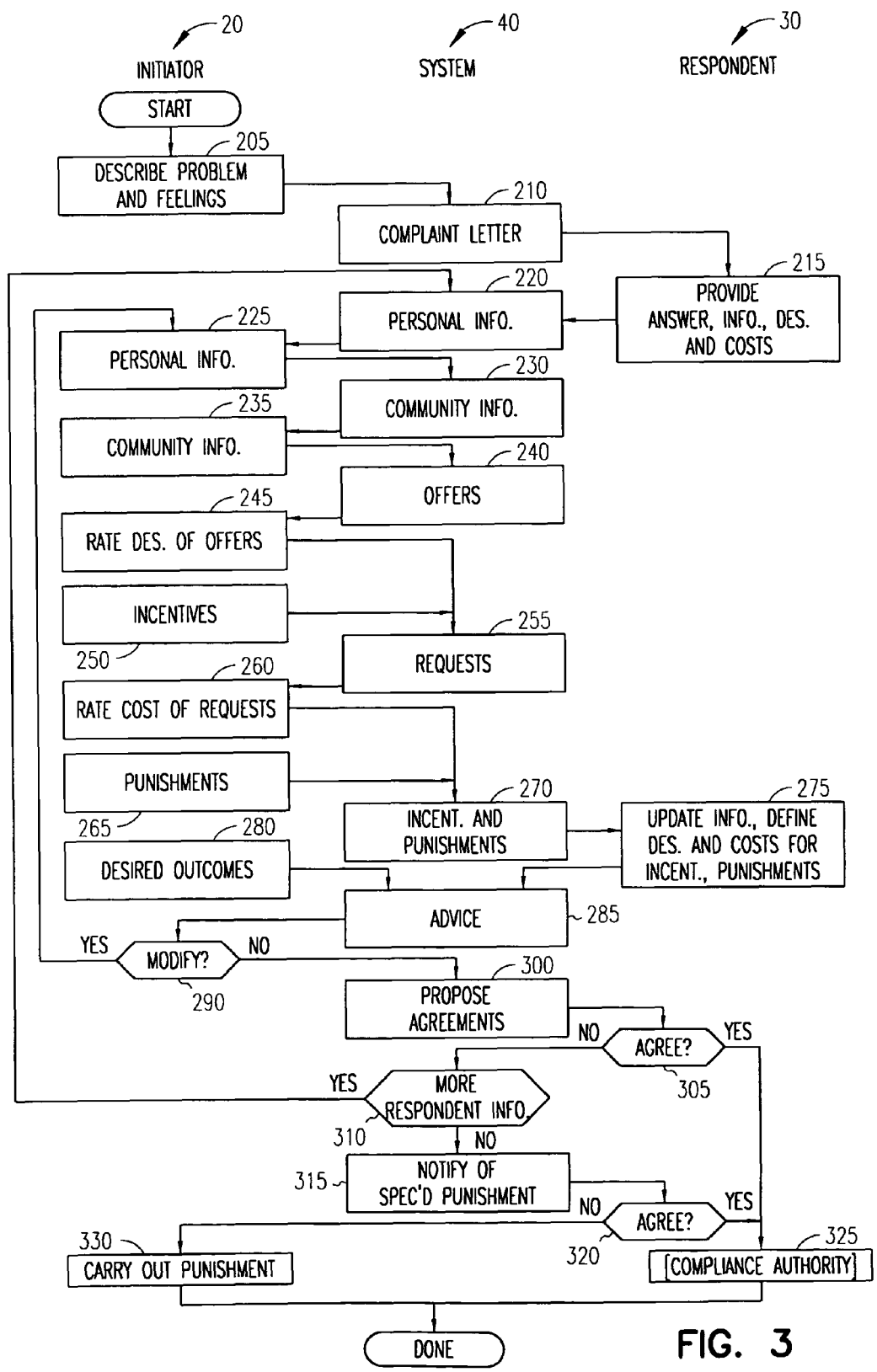

FIG. 3 depicts a flowchart for an embodiment assuming that initiator 20 is from a high context culture and respondent 30 is from a low context culture. Generally, FIG. 3 illustrates how system 40 can bridge between a high context culture and a low context culture in similar manner as described above with regard to FIG. 2.

Let it be assumed that the initiator and respondent entered into a contract for initiator to deliver an item to respondent after an initial partial payment and then to accept remaining payments according to a schedule. Let it be further assumed that respondent 30 has not paid according to the payment schedule, and initiator 20 is using system 40 to resolve the payment dispute.

Since initiator 20 is from a high context culture, system 40 obtains information from initiator 20 according to a gradual iterative process, interspersing collection of factual information with collection of personal information.

Since respondent 30 is from a low context culture, system 40 provides collected information as a one-time event, assuming that respondent 30 will prefer to deal with this dispute as one "action item" on an agenda, as opposed to an on-going portion of its business activity. Instead of advising respondent 30, system 40 presents alternatives, assuming that respondent 30 prefers to select its own outcome rather than be advised.

At step 205, initiator 20 provides a description of the problem and their feelings regarding the problem, and if desired, the entire relationship between initiator 20 and respondent 30, such as replying to questions presented at a web site. At step 210, system 40 prepares a complaint letter focusing on the facts of the complaint and summarizing the feelings of initiator 20. After initiator 20 has approved the complaint letter, system 40 sends the complaint letter to respondent 30, such as via e-mail or other suitable transmission mode.

At step 215, respondent 30 provides information relating to why it has not made payments on time, request factors for initiator 20 and their desirability ratings, offer factors to initiator 20 and their cost ratings, personal information as of when the contract was entered into, the current situation and expected future situations, and provides references that initiator 20 may contact to discuss the character of respondent 30. Respondent 30 also indicates at what time during the dispute resolution its information should be revealed to initiator 20, that is "early", "intermediate" or "well into" the dispute resolution; these are referred to as "timing indications". For example, the first iteration of dispute resolution is "early", whereas the second and third iterations are "intermediate" and "well into", respectively. In a modification, instead of or in addition to timing indicators, respondent 30 may provide conditional triggers, of the form "reveal this information only if the following event occurs".

At steps 220, 230, and 240, system 40 interactively provides to initiator 20 portions of the information provided by respondent 30 in accordance with the timing indications and/or conditional triggers from respondent 30. Interspersed with the provision of the respondent's information, at step 225, initiator 20 replies with its personal information, at step 235, initiator 20 replies with its own community information, at step 245, initiator 20 rates the desirability of the offer factors from respondent 30, at step 250, initiator 20 provides incentives to respondent 30 to agree to a resolution of the present dispute, at step 260, initiator 20 rates the costs of the request factors from respondent 30, at step 265, initiator 20 provides punishments that it might take if respondent 30 fails to agree on a resolution of the instant dispute, and at step 280, initiator 20 provides a few acceptable alternative outcomes.

At step 270, system 40 presents to respondent 30 the incentives and punishments provided by initiator 20. At step 275, respondent 30 may optionally update (modify, delete or add) the information supplied at step 215, and provides desirability and cost ratings for the initiator's incentives and punishments.

At step 285, system 40 advises initiator 20, such as suggesting provision of more incentives or desired outcomes. As an example, system 40 tries to provide three different agreements based on a variety of incentives, punishments and outcomes, and so can suggest types of factors relative to "template" agreements having certain numbers of factors and/or ratings. At step 290, initiator 20 decides whether to update, that is, modify, delete or add to, its previously provided responses. If so, then system 40 returns to step 225.

If initiator 20 decides not to update its information, then at step 300, system 40 proposes a set of dispute resolution agreements. System 40 may use similar techniques at step 300 as are used at step 165 of FIG. 2, however, at step 300, system 40 is creating a set of agreements, rather than one agreement. As an example, the set may comprise three agreements, the first having one incentive and one offer, the second having two incentives and two offers, and the third having three incentives and two offer and one request. Other ways of constructing sets of agreements will be apparent to those of ordinary skill in the art of dispute resolution.

Steps 305-330 are broadly similar to steps 170-200 of FIG. 2, discussed above. Steps 305-330 will not be discussed here for brevity.

Although the embodiments presented include only two parties, it will be appreciated that the instant techniques can be used with more than two parties.

For pre-contract negotiations, the present technique may be used in a diagnostic manner, for example, to ensure that there are community connections and factors available for negotiation should contract non-performance occur.

Although the embodiments presented assumed that the initiator and respondent were operating according to different cultural models, high context and low context, in other embodiments, the parties to the dispute may be operating according to the same cultural model, or according to variations of a cultural model.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of resolving a dispute related to a preexisting contract, the method comprising:

receiving in a computerized system a request from an initiator for dispute resolution related to non-performance of the preexisting contract between the initiator and a respondent; and presenting via the computerized system information related to the request for dispute resolution to the respondent in a cultural context different from that of the initiator, the difference in the cultural contexts being a high-context culture relative to a low-context culture.

2. The method for resolving a dispute of claim 1, further comprising:

receiving in the computerized system respondent information related to the dispute from the respondent, and presenting via the computerized system the respondent information related to the dispute to the initiator.

3. The method of claim 2, further comprising:
multiple iterations of receiving information from at least one of the initiator or respondent; and
presenting the received information to the other of the initiator or respondent.

4. The method for resolving a dispute of claim 1, wherein the low-context culture is a transaction-based culture and the high-context culture is a relationship-based culture.

5. The method for resolving a dispute of claim 1, wherein information related to the request for dispute resolution comprises appropriate actions.

6. The method for resolving a dispute of claim 1, wherein the information related to the request for dispute resolution comprises possible resolutions.

7. The method for resolving a dispute of claim 1, wherein the information related to the request for dispute resolution further comprises at least one factor, the at least one factor comprising at least one of an incentive, a punishment, a desired outcome, and a harm.

8. The method for resolving a dispute of claim 1, wherein the information related to the request for dispute resolution comprises a user rating of at least one of cost or desirability of at least one factor.

9. The method for resolving a dispute of claim 1, wherein the dispute is regarding an online transaction.

10. The method for resolving a dispute of claim 9, wherein the online transaction is an online auction.

11. A method of resolving a dispute related to a preexisting contract, the method comprising:
receiving from an initiator a request for dispute resolution related to non-performance of the preexisting contract between the initiator and a respondent; and
presenting via a computerized system information related to the request for dispute resolution to the respondent, the information related to the request for dispute resolution including at least one factor, the at least one factor comprising at least one of an incentive, a punishment, a desired outcome, and a harm.

12. The method for resolving a dispute of claim 11, wherein the incentive comprises at least one incentive, the incentives including an extension of credit, serving as a reference, providing introductions, providing training, and providing marketing.

13. The method for resolving a dispute of claim 11, wherein the punishment comprises at least one punishment, the punishment including filing a complaint, filing a lawsuit, repossession, termination of a business relationship, and seeking arbitration.

14. The method for resolving a dispute of claim 11, wherein the desired outcome comprises at least one desired outcome, the desired outcome including payment for goods, delivery of goods, a whole or partial refund, agreement to revised terms, and unwinding a transaction.

15. The method for resolving a dispute of claim 11, wherein the harm comprises at least one type of harm, the harm including a harm that has been realized, a harm that will occur in the future, and an action taken to mitigate damages.

16. The method for resolving a dispute of claim 11, further comprising:
receiving in the computerized system respondent information related to the dispute from the respondent; and
presenting via the computerized system the respondent information related to the dispute to the initiator.

17. The method for resolving a dispute of claim 16, further comprising:
multiple iterations of receiving information from at least one of the initiator or respondent; and
presenting the received information to the other of the initiator or respondent.

18. The method for resolving a dispute of claim 11, wherein the dispute is regarding an online transaction.

19. The method for resolving a dispute of claim 18, wherein the online transaction is an online auction.

20. The method for resolving a dispute of claim 11, wherein the presenting via the computerized system information related to the request for dispute resolution to the respondent comprises presentation of the information in a cultural context different from that of the initiator.

21. The method for resolving a dispute of claim 20, wherein the difference in cultural contexts is a high context culture context relative to a low context culture context.

22. The method for resolving a dispute of claim 20, wherein the difference in cultural contexts is a transaction-based cultural context relative to a relationship-based cultural context.

23. A computerized mediation system, comprising:
a network connection linking the computerized mediation system to at least one other computer system of an initiator or a respondent; and
a dispute resolution module operable to resolve a dispute related to non-performance of a preexisting contract, by receiving a request from an initiator for dispute resolution related to the preexisting contract between the initiator and the respondent, and by presenting information related to the request for dispute resolution to the respondent in a cultural context different from that of the initiator, the difference in the cultural contexts being a high-context culture relative to a low-context culture.

24. The computerized mediation system of claim 23, wherein the dispute resolution module comprises software executable on the computerized mediation system.

25. The computerized mediation system of clam 23, further comprising nonvolatile storage operable to store information related to the request for dispute resolution.

26. The computerized mediation system of claim 23, the dispute resolution module further operable to receive respondent information related to the dispute from the respondent, and to present via the computerized system the respondent information related to the dispute to the initiator.

27. The computerized mediation system of claim 23, wherein the information related to the request for dispute resolution further comprises at least one factor, the at least one factor comprising at least one of an incentive, a punishment, a desired outcome, and a harm.

28. The computerized mediation system of claim 23, wherein the dispute is regarding an online transaction.

29. The computerized mediation system of claim 28, wherein the online transaction is an online auction.

30. A computerized mediation system, comprising:
a network connection linking the computerized mediation system to at least one other computer system of an initiator or a respondent; and
a dispute resolution module operable to receive from an initiator a request for dispute resolution related to non-performance of a preexisting contract between the initiator and the respondent, and to present information related to the request for dispute resolution to the respondent, the information related to the request for dispute resolution including at least one factor, the at least one factor comprising at least one of an incentive, a punishment, a desired outcome, and a harm.

31. The computerized mediation system of claim 30, wherein the incentive comprises at least one incentive, the incentives including an extension of credit, serving as a reference, providing introductions, providing training, and providing marketing.

32. The computerized mediation system of claim 30, wherein the punishment comprises at least one punishment, the punishment including filing a complaint, filing a lawsuit, repossession, termination of a business relationship, and seeking arbitration.

33. The computerized mediation system of claim 30, wherein the desired outcome comprises at least one desired outcome, the desired outcome including payment for goods, delivery of goods, a whole or partial refund, agreement to revised terms, and unwinding a transaction.

34. The computerized mediation system of claim 30, wherein the harm comprises at least one type of harm, the harm including a harm that has been realized, a harm that will occur in the future, and an action taken to mitigate damages.

35. The computerized mediation system of claim 30, further comprising:
the computerized system to receive respondent information related to the dispute from the respondent; and
the computerized system further to present the respondent information related to the dispute to the initiator.

36. The computerized mediation system of claim 35, further comprising:
the computerized system to receive multiple iterations of information from at least one of the initiator or respondent; and
the computerized system to present received information to the other of the initiator or respondent.

37. The computerized mediation system of claim 30, wherein the presenting via the computerized system information related to the request for dispute resolution to the respondent comprises presentation of the information in a cultural context different from that of the initiator.

38. The computerized mediation system of claim 37, wherein the difference in cultural contexts is a high context culture context relative to a low context culture context.

39. The computerized mediation system of claim 37, wherein the difference in cultural contexts is a transaction-based cultural context relative to a relationship-based cultural context.

40. A machine-readable storage medium having instructions stored thereon that when executed by one or more processors are operable to cause a computerized system to perform operations comprising:
receiving via a network connection a request from an initiator for dispute resolution related to non-performance of a preexisting contract between the initiator and a respondent; and
presenting via a network connection information related to the request for dispute resolution to the respondent in a cultural context different from that of the initiator, the difference in the cultural contexts being a high-context culture relative to a low-context culture.

41. The machine-readable storage medium of claim 40, further comprising:
receiving respondent information related to the dispute from the respondent; and
presenting the respondent information related to the dispute to the initiator.

42. The machine-readable storage medium of claim 40, wherein the information related to the request for dispute resolution further comprises at least one factor, the at least one factor comprising at least one of an incentive, a punishment, a desired outcome, and a harm.

43. The machine-readable storage medium of claim 40, wherein the dispute is regarding an online transaction.

44. The machine-readable storage medium of claim 43, wherein the online transaction is an online auction.

45. A machine-readable storage medium having instructions stored thereon that when executed by one or more processors are operable to cause a computerized system to perform operations comprising:
receiving from an initiator a request for dispute resolution related to non-performance of a preexisting contract between the initiator and a respondent; and
presenting information related to the request for dispute resolution to the respondent, the information related to the request for dispute resolution including at least one factor, the at least one factor comprising at least one of an incentive, a punishment, a desired outcome, and a harm.

46. The machine-readable storage medium of claim 45, wherein the incentive comprises at least one of extension of credit, serving as a reference, providing introductions, providing training, and providing marketing.

47. The machine-readable storage medium of claim 45, wherein the punishment comprises at least one of the following punishments including filing a complaint, filing a lawsuit, repossession, termination of a business relationship, and seeking arbitration.

48. The machine-readable storage medium of claim 45, wherein the desired outcome comprises at least one of the desired outcomes including payment for goods, delivery of goods, a whole or partial refund, agreement to revised terms, and unwinding a transaction.

49. The machine-readable storage medium of claim 45, wherein the harm comprises at least one of the harms including a harm that has been realized, a harm that will occur in the future, and an action taken to mitigate damages.

50. The machine-readable storage medium of claim 45, further comprising:
receiving respondent information related to the dispute from the respondent; and
presenting the respondent information related to the dispute to the initiator.

51. The machine-readable storage medium of claim 50, further comprising:
receiving multiple iterations of information from at least one of the initiator or respondent; and
presenting the received information to the other of the initiator or respondent.

52. The machine-readable storage medium of claim 45, wherein the presenting via the computerized system information related to the request for dispute resolution to the respondent comprises presentation of the information in a cultural context different from that of the initiator.

53. The machine-readable storage medium of claim 52, wherein the difference in cultural contexts is a high context culture context relative to a low context culture context.

54. The machine-readable storage medium of claim 52, wherein the difference in cultural contexts is a transaction-based cultural context relative to a relationship-based cultural context.

55. A method of resolving a dispute related to a preexisting contract, the method comprising:
receiving in a computerized system a request from an initiator for dispute resolution related to non-performance of the preexisting contract between the initiator and a respondent;

presenting via the computerized system information related to the request for dispute resolution to the respondent in a cultural context different from that of the initiator;

receiving in the computerized system respondent information related to the dispute from the respondent; and presenting via the computerized system the respondent information related to the dispute to the initiator, the information related to the request for dispute resolution including at least one factor, the at least one factor comprising at least one of an incentive, a punishment, a desired outcome, and a harm, the information related to the request for dispute resolution further comprising a user rating from at least one of the initiator or the respondent of at least one of cost or desirability of the at least one factor.

56. The method for resolving a dispute of claim 55, wherein the dispute is regarding an online transaction.

57. The method for resolving a dispute of claim 56, wherein the online transaction is an online auction.

58. A method of resolving a dispute related to a preexisting contract, the method comprising:

receiving from an initiator a request for dispute resolution related to the preexisting contract between the initiator and a respondent;

presenting via the computerized system information related to the request for dispute resolution to the respondent, the information related to the request for dispute resolution including at least one factor, the at least one factor comprising at least one of an incentive, a punishment, a desired outcome, and a harm;

receiving in the computerized system respondent information related to the dispute from the respondent; and presenting via the computerized system the respondent information related to the dispute to the initiator, the receiving and presenting of the respondent information including multiple iterations of receiving information from at least one of the initiator or respondent and presenting the received information to the other of the initiator or respondent.

59. The method for resolving a dispute of claim 58, wherein the presenting via the computerized system information related to the request for dispute resolution comprises presentation of information in a cultural context different from that of at least one of the initiator or the respondent.

* * * * *

UNITED STATES PATENT AND TRADEMARK OFFICE
CERTIFICATE OF CORRECTION

PATENT NO.       : 8,364,602 B2
APPLICATION NO.  : 11/004699
DATED            : January 29, 2013
INVENTOR(S)      : Femenia et al.

It is certified that error appears in the above-identified patent and that said Letters Patent is hereby corrected as shown below:

On the Title Page

On page 2, column 1, under "U.S. Patent Documents", line 66, In citation for "U.S. Patent Documents", "2002/0147604 A1", delete "Slate, II et al." and insert --Slate II, et al.--, therefor On page 2, column 2, under "Foreign Patent Documents", line 5, In citation for "Foreign Patent Documents", "WO-2004111774 A3, delete "A3" and insert --A2--, therefor On page 2, in column 2, under "Other Publications", line 2, delete "date" and insert --mailed--, therefor On page 2, in column 2, under "Other Publications", line 3, delete "Lisa ," and insert --Lisa,--, therefor On page 2, in column 2, under "Other Publications", line 3, delete "Insurance." and insert --Insurance,--, therefor On page 2, in column 2, under "Other Publications", line 4, delete "1988),6 Pages." and insert --1988), 6 Pages.--, therefor On page 2, in column 2, under "Other Publications", line 5-6, after "Transaction", delete "Technical", therefor On page 2, in column 2, under "Other Publications", line 6, delete "Bulltetin" and insert --Bulletin--, therefor On page 2, in column 2, under "Other Publications", line 6, delete "1995),83-84." and insert --1995), 83-84.--, therefor On page 2, in column 2, under "Other Publications", line 11, delete "1995),3 Pages." and insert Signed and Sealed this
Eleventh Day of November, 2014

Michelle K. Lee
*Deputy Director of the United States Patent and Trademark Office*

CERTIFICATE OF CORRECTION (continued)
U.S. Pat. No. 8,364,602 B2

--1995), 3 Pages.--, therefor

On page 2, in column 2, under "Other Publications", line 12, delete "E ," and insert --E.,--, therefor On page 2, in column 2, under "Other Publications", line 14, delete "1991),53-61." and insert --1991), 53-61.--, therefor On page 2, in column 2, under "Other Publications", line 17, delete "1995),73." and insert --1995), 73.--, therefor On page 2, in column 2, under "Other Publications", line 18, delete "I ," and insert --I.,--, therefor On page 2, in column 2, under "Other Publications", line 20, delete "(Jul. 1998),29-32." and insert --(Jul. 1998), 29-32.--, therefor On page 2, in column 2, under "Other Publications", line 21, delete "R ," and insert --R.,--, therefor On page 2, in column 2, under "Other Publications", line 22, delete "39(3)." and insert --39(3),--, therefor On page 2, in column 2, under "Other Publications", line 22-23, delete "1996),363-366" and insert --1996), 363-366.--, therefor On page 2, in column 2, under "Other Publications", line 24, delete "C" and insert --C.--, therefor On page 2, in column 2, under "Other Publications", line 26, delete "(Sep. 1994),251-274." and insert --(Sep. 1994), 251-274.--, therefor On page 2, in column 2, under "Other Publications", line 27, delete "Anne ," and insert --Anne,--, therefor On page 2, in column 2, under "Other Publications", line 28, delete "(Jan. 2001),27-30" and insert --(Jan. 2001), 27-30.--, therefor On page 2, in column 2, under "Other Publications", line 29, delete "Stefan ," and insert --Stefan,--, therefor On page 2, in column 2, under "Other Publications", line 31, delete "1997),3-6." and insert --1997), 3-6.--, therefor On page 2, in column 2, under "Other Publications", line 32, delete "H" and insert --H.--, therefor On page 2, in column 2, under "Other Publications", line 33, delete "Auctions." and insert --Auctions,--, therefor On page 2, in column 2, under "Other Publications", line 34, delete "(Dec. 1997),24-28." and insert --(Dec. 1997), 24-28.--, therefor On page 2, in column 2, under "Other Publications", line 36, delete "thr" and insert --the--, therefor On page 2, in column 2, under "Other Publications", line 38, delete "1996),397-408." and insert --1996), 397-408.--, therefor On page 2, in column 2, under "Other Publications", line 40, delete "ACM." and insert --ACM,--, therefor On page 2, in column 2, under "Other Publications", line 40, delete "(Jun. 1987),484-497." and insert --(Jun. 1987), 484-497.--, therefor On page 2, in column 2, under "Other Publications", line 41, delete "Jodi ," and insert --Jodi,--, therefor On page 2, in column 2, under "Other Publications", line 43, delete "(Jul. 8, 1996),2 pages" and insert --(Jul. 8, 1996), 2 pages--, therefor On page 2, in column 2, under "Other Publications", line 44, delete "Marcel ," and insert --Marcel,--, therefor On page 2, in column 2, under "Other Publications", line 45, delete "1994),39-50." and insert --1994), 39-50.--, therefor On page 2, in column 2, under "Other Publications", line 49, delete "(Dec. 1992),278-288." and insert --(Dec. 1992), 278-288.--, therefor On page 2, in column 2, under "Other Publications", line 50, delete "D" and insert --D.--, therefor On page 2, in column 2, under "Other Publications", line 53, delete "Martin ," and insert --Martin,--, therefor On page 2, in column 2, under "Other Publications", line 54, delete "Software." and insert --Software,--, therefor On page 2, in column 2, under "Other Publications", line 54, delete "(Jun. 1993),245-252." and insert --(Jun. 1993), 245-525.--, therefor On page 2, in column 2, under "Other Publications", line 56, delete "Martin ," and insert --Martin,--, therefor On page 2, in column 2, under "Other Publications", line 58, delete "Theme,(Dec. 1997),17-23." and insert --Theme, (Dec. 1997), 17-23.--, therefor On page 3, in column 1, under "Other Publications", line 1, delete "Todd ," and insert --Todd,--, CERTIFICATE OF CORRECTION (continued)
U.S. Pat. No. 8,364,602 B2 therefor

On page 3, in column 1, under "Other Publications", line 7, delete "(2002),1-326." and insert --(2002), 1-326.--, therefor On page 3, in column 1, under "Other Publications", line 8, delete "B" and insert --B.--, therefor On page 3, in column 1, under "Other Publications", line 10, delete "Centre." and insert --Centre,--, therefor On page 3, in column 1, under "Other Publications", line 11, delete "No. 9/10,(Oct. 1993),3-4" and insert --No. 9/10, (Oct. 1993), 3-4.--, therefor On page 3, in column 1, under "Other Publications", line 12, delete "Ken ," and insert --Ken,--, therefor On page 3, in column 1, under "Other Publications", line 13, delete "1995),A5(1)" and insert --1995), A5(1)--, therefor On page 3, in column 1, under "Other Publications", line 14, delete "Ingvar ," and insert --Ingvar,--, therefor On page 3, in column 1, under "Other Publications", line 15, delete "(1997),1-10." and insert --(1997), 1-10.--, therefor On page 3, in column 1, under "Other Publications", line 16, delete "E ," and insert --E.,--, therefor On page 3, in column 1, under "Other Publications", line 18, delete "1997),7-11." and insert --1997), 7-11.--, therefor On page 3, in column 1, under "Other Publications", line 19, delete "E ," and insert --E.,--, therefor On page 3, in column 1, under "Other Publications", line 20, delete "Auctions." and insert --Auctions,--, therefor On page 3, in column 1, under "Other Publications", line 21, delete "Theme,(1997),29-34." and insert --Theme, (1997), 29-34.--, therefor On page 3, in column 1, under "Other Publications", line 22, delete "A ," and insert --A.,--, therefor On page 3, in column 1, under "Other Publications", line 24, delete "1996),1-16." and insert --1996), 1-16.--, therefor On page 3, in column 1, under "Other Publications", line 25, delete "Vladimir ," and insert --Vladimir,--, therefor On page 3, in column 1, under "Other Publications", line 26, delete "1996),3-23." and insert --1996), 3-26.--, therefor On page 3, in column 1, under "Other Publications", line 28, before "U.S.", insert --"--, therefor On page 3, in column 1, under "Other Publications", line 28, after "2010,", insert --"--, therefor On page 3, in column 1, under "Other Publications", line 30, before "U.S.", insert --"--, therefor On page 3, in column 1, under "Other Publications", line 30, after "2009,", insert --"--, therefor On page 3, in column 1, under "Other Publications", line 32, before "U.S.", insert --"--, therefor On page 3, in column 1, under "Other Publications", line 32, after "2004,", insert --"--, therefor On page 3, in column 1, under "Other Publications", line 34, before "U.S.", insert --"--, therefor On page 3, in column 1, under "Other Publications", line 34, after "2005,", insert --"--, therefor On page 3, in column 1, under "Other Publications", line 36, before "U.S.", insert --"--, therefor On page 3, in column 1, under "Other Publications", line 36, after "2005,", insert --"--, therefor On page 3, in column 1, under "Other Publications", line 37, before "U.S.", insert --"--, therefor On page 3, in column 1, under "Other Publications", line 37, after "2005,", insert --"--, therefor On page 3, in column 1, under "Other Publications", line 39, before "U.S.", insert --"--, therefor On page 3, in column 1, under "Other Publications", line 39, after "2008,", insert --"--, therefor On page 3, in column 1, under "Other Publications", line 41, before "U.S.", insert --"--, therefor On page 3, in column 1, under "Other Publications", line 41, after "2003,", insert --"--, therefor On page 3, in column 1, under "Other Publications", line 43, before "U.S.", insert --"--, therefor On page 3, in column 1, under "Other Publications", line 44, after "2010,", insert --"--, therefor On page 3, in column 1, under "Other Publications", line 45, before "U.S.", insert --"--, therefor On page 3, in column 1, under "Other Publications", line 46, after "2004,", insert --"--, therefor On page 3, in column 1, under "Other Publications", line 47, before "U.S.", insert --"--, therefor On page 3, in column 1, under "Other Publications", line 48, after "2008,", insert --"--, therefor On page 3, in column 1, under "Other Publications", line 49, before "U.S.", insert --"--, therefor On page 3, in column 1, under "Other Publications", line 50, after "2009,", insert --"--, therefor On page 3, in column 1, under "Other Publications", line 51, before "U.S.", insert --"--, therefor On page 3, in column 1, under "Other Publications", line 52, after "2010,", insert --"--, therefor On page 3, in column 1, under "Other Publications", line 53, before "U.S.", insert --"--, therefor On page 3, in column 1, under "Other Publications", line 54, after "2007,", insert --"--, therefor On page 3, in column 1, under "Other Publications", line 55, before "U.S.", insert --"--, therefor On page 3, in column 1, under "Other Publications", line 56, after "2010,", insert --"--, therefor On page 3, in column 1, under "Other Publications", line 57, before "U.S.", insert --"--, therefor On page 3, in column 1, under "Other Publications", line 58, after "2005,", insert --"--, therefor On page 3, in column 1, under "Other Publications", line 59, before "U.S.", insert --"--, therefor On page 3, in column 1, under "Other Publications", line 60, after "2010,", insert --"--, therefor On page 3, in column 1, under "Other Publications", line 61, before "U.S.", insert --"--, therefor On page 3, in column 1, under "Other Publications", line 62, after "2008,", insert --"--, therefor On page 3, in column 1, under "Other Publications", line 63, before "U.S.", insert --"--, therefor On page 3, in column 1, under "Other Publications", line 64, after "2003,", insert --"--, therefor On page 3, in column 1, under "Other Publications", line 65, before "U.S.", insert --"--, therefor On page 3, in column 1, under "Other Publications", line 66, after "2009,", insert --"--, therefor On page 3, in column 1, under "Other Publications", line 67, before "U.S.", insert --"--, therefor On page 3, in column 1, under "Other Publications", line 68, after "2004,", insert --"--, therefor On page 3, in column 1, under "Other Publications", line 69, before "U.S.", insert --"--, therefor
On page 3, in column 1, under "Other Publications", line 70, after "2008,", insert --"--, therefor

CERTIFICATE OF CORRECTION (continued)
U.S. Pat. No. 8,364,602 B2

On page 3, in column 1, under "Other Publications", line 71, before "U.S.", insert --"--, therefor On page 3, in column 1, under "Other Publications", line 71, after "2006,", insert --"--, therefor On page 3, in column 1, under "Other Publications", line 72, before "U.S.", insert --"--, therefor On page 3, in column 1, under "Other Publications", line 72, after "2004", insert --"--, therefor On page 3, in column 2, under "Other Publications", line 1, before "U.S.", insert --"--, therefor On page 3, in column 2, under "Other Publications", line 2, after "2008,", insert --"--, therefor On page 3, in column 2, under "Other Publications", line 3, before "U.S.", insert --"--, therefor On page 3, in column 2, under "Other Publications", line 3, after "2006,", insert --"--, therefor On page 3, in column 2, under "Other Publications", line 5, before "U.S.", insert --"-, therefor On page 3, in column 2, under "Other Publications", line 5, after "2004", insert --"--, therefor On page 3, in column 2, under "Other Publications", line 7, before "U.S.", insert --"--, therefor On page 3, in column 2, under "Other Publications", line 7, after "2012,", insert --"--, therefor On page 3, in column 2, under "Other Publications", line 9, before "U.S.", insert --"--, therefor On page 3, in column 2, under "Other Publications", line 10, after "2005,", insert --"--, therefor On page 3, in column 2, under "Other Publications", line 11, before "U.S.", insert --"--, therefor On page 3, in column 2, under "Other Publications", line 12, after "2005,", insert --"--, therefor On page 3, in column 2, under "Other Publications", line 13, before "U.S.", insert --"--, therefor On page 3, in column 2, under "Other Publications", line 14, after "2003,", insert --"--, therefor On page 3, in column 2, under "Other Publications", line 15, before "U.S.", insert --"--, therefor On page 3, in column 2, under "Other Publications", line 16, after "2003,", insert --"--, therefor On page 3, in column 2, under "Other Publications", line 17, before "U.S.", insert --"--, therefor On page 3, in column 2, under "Other Publications", line 18, after "2005,", insert --"--, therefor On page 3, in column 2, under "Other Publications", line 19, before "U.S.", insert --"--, therefor On page 3, in column 2, under "Other Publications", line 20, after "2004,", insert --"--, therefor On page 3, in column 2, under "Other Publications", line 21, before "U.S.", insert --"--, therefor On page 3, in column 2, under "Other Publications", line 22, after "2005,", insert --"--, therefor On page 3, in column 2, under "Other Publications", line 23, before "U.S.", insert --"--, therefor On page 3, in column 2, under "Other Publications", line 23, after "2007,", insert --"--, therefor On page 3, in column 2, under "Other Publications", line 25, before "U.S.", insert --"--, therefor On page 3, in column 2, under "Other Publications", line 25, after "2007,", insert --"--, therefor On page 3, in column 2, under "Other Publications", line 27, before "U.S.", insert --"--, therefor On page 3, in column 2, under "Other Publications", line 27, after "2008,", insert --"--, therefor On page 3, in column 2, under "Other Publications", line 29, before "U.S.", insert --"--, therefor On page 3, in column 2, under "Other Publications", line 29, after "2009,", insert --"--, therefor On page 3, in column 2, under "Other Publications", line 31, before "U.S.", insert --"--, therefor On page 3, in column 2, under "Other Publications", line 32, after "2003,", insert --"--, therefor On page 3, in column 2, under "Other Publications", line 33, before "U.S.", insert --"--, therefor On page 3, in column 2, under "Other Publications", line 34, after "2006,", insert --"--, therefor On page 3, in column 2, under "Other Publications", line 35, before "U.S.", insert --"--, therefor On page 3, in column 2, under "Other Publications", line 36, after "2005,", insert --"--, therefor On page 3, in column 2, under "Other Publications", line 37, before "U.S.", insert --"--, therefor On page 3, in column 2, under "Other Publications", line 38, after "2003,", insert --"--, therefor On page 3, in column 2, under "Other Publications", line 39, before "U.S.", insert --"--, therefor On page 3, in column 2, under "Other Publications", line 40, after "2006,", insert --"--, therefor On page 3, in column 2, under "Other Publications", line 41, before "U.S.", insert --"--, therefor
On page 3, in column 2, under "Other Publications", line 42, after "2004,", insert --"--, therefor On page 3, in column 2, under "Other Publications", line 43, before "U.S.", insert --"--, therefor On page 3, in column 2, under "Other Publications", line 44, after "2009,", insert --"--, therefor On page 3, in column 2, under "Other Publications", line 45, before "U.S.", insert --"--, therefor On page 3, in column 2, under "Other Publications", line 46, after "2008,", insert --"--, therefor On page 3, in column 2, under "Other Publications", line 47, before "U.S.", insert --"--, therefor On page 3, in column 2, under "Other Publications", line 47, after "2010,", insert --"--, therefor On page 3, in column 2, under "Other Publications", line 49, before "U.S.", insert --"--, therefor On page 3, in column 2, under "Other Publications", line 50, after "2007,", insert --"--, therefor On page 3, in column 2, under "Other Publications", line 51, before "U.S.", insert --"--, therefor On page 3, in column 2, under "Other Publications", line 52, after "2006,", insert --"--, therefor On page 3, in column 2, under "Other Publications", line 53, before "U.S.", insert --"--, therefor On page 3, in column 2, under "Other Publications", line 54, after "2004,", insert --"--, therefor On page 3, in column 2, under "Other Publications", line 55, before "U.S.", insert --"--, therefor On page 3, in column 2, under "Other Publications", line 56, after "2009,", insert --"--, therefor On page 3, in column 2, under "Other Publications", line 57, before "U.S.", insert --"--, therefor On page 3, in column 2, under "Other Publications", line 58, after "2008,", insert --"--, therefor On page 3, in column 2, under "Other Publications", line 59, before "U.S.", insert --"--, therefor On page 3, in column 2, under "Other Publications", line 60, after "2007,", insert --"--, therefor On page 3, in column 2, under "Other Publications", line 61, before "U.S.", insert --"--, therefor On page 3, in column 2, under "Other Publications", line 62, after "2005,", insert --"--, therefor On page 3, in column 2, under "Other Publications", line 63, before "U.S.", insert --"--, therefor On page 3, in column 2, under "Other Publications", line 64, after "2006,", insert --"--, therefor
On page 3, in column 2, under "Other Publications", line 65, before "U.S.", insert --"--, therefor On page 3, in column 2, under "Other Publications", line 66, after "2003,", insert --"--, therefor On page 3, in column 2, under "Other Publications", line 67, before "U.S.", insert --"--, therefor On page 3, in column 2, under "Other Publications", line 68, after "2007,", insert --"-- therefor On page 3, in column 2, under "Other Publications", line 69, before "U.S.", insert --"--, therefor On page 3, in column 2, under "Other Publications", line 70, after "2008,", insert --"--, therefor On page 3, in column 2, under "Other Publications", line 71, before "U.S.", insert --"--, therefor On page 3, in column 2, under "Other Publications", line 72, after "2009,", insert --"--, therefor On page 4, in column 1, under "Other Publications", line 1, before "U.S.", insert --"--, therefor On page 4, in column 1, under "Other Publications", line 1, after "2009,", insert --"--, therefor On page 4, in column 1, under "Other Publications", line 3, before "U.S.", insert --"--, therefor On page 4, in column 1, under "Other Publications", line 3, after "2009,", insert --"--, therefor On page 4, in column 1, under "Other Publications", line 5, before "U.S.", insert --"--, therefor On page 4, in column 1, under "Other Publications", line 6, after "2008,", insert --"--, therefor On page 4, in column 1, under "Other Publications", line 7, before "U.S.", insert --"--, therefor On page 4, in column 1, under "Other Publications", line 7, after "2009,", insert --"--, therefor On page 4, in column 1, under "Other Publications", line 9, before "U.S.", insert --"--, therefor On page 4, in column 1, under "Other Publications", line 9, after "2010,", insert --"--, therefor On page 4, in column 1, under "Other Publications", line 11, before "U.S.", insert --"--, therefor On page 4, in column 1, under "Other Publications", line 12, after "2008,", insert --"--, therefor On page 4, in column 1, under "Other Publications", line 13, before "U.S.", insert --"--, therefor On page 4, in column 1, under "Other Publications", line 14, after "2009,", insert --"--, therefor On page 4, in column 1, under "Other Publications", line 15, before "U.S.", insert --"--, therefor On page 4, in column 1, under "Other Publications", line 16, after "2009,", insert --"--, therefor On page 4, in column 1, under "Other Publications", line 17, before "U.S.", insert --"--, therefor On page 4, in column 1, under "Other Publications", line 17, delete "Apr. 4. 2010," and insert --Apr. 08. 2010,"--, therefor On page 4, in column 1, under "Other Publications", line 19, before "U.S.", insert --"--, therefor On page 4, in column 1, under "Other Publications", line 19, after "2010,", insert --"--, therefor On page 4, in column 1, under "Other Publications", line 20, before "U.S.", insert --"--, therefor On page 4, in column 1, under "Other Publications", line 20, after "2010,", insert --"--, therefor On page 4, in column 1, under "Other Publications", line 22, before "U.S.", insert --"--, therefor On page 4, in column 1, under "Other Publications", line 22, after "2011,", insert --"--, therefor On page 4, in column 1, under "Other Publications", line 24, before "U.S.", insert --"--, therefor On page 4, in column 1, under "Other Publications", line 25, after "2009,", insert --"--, therefor On page 4, in column 1, under "Other Publications", line 26, before "U.S.", insert --"--, therefor On page 4, in column 1, under "Other Publications", line 27, after "2010,", insert --"--, therefor On page 4, in column 1, under "Other Publications", line 28, before "U.S.", insert --"--, therefor On page 4, in column 1, under "Other Publications", line 29, after "2010,", insert --"--, therefor On page 4, in column 1, under "Other Publications", line 30, before "U.S.", insert --"--, therefor On page 4, in column 1, under "Other Publications", line 31, after "2011,", insert --"--, therefor On page 4, in column 1, under "Other Publications", line 32, before "U.S.", insert --"--, therefor On page 4, in column 1, under "Other Publications", line 33, after "2009,", insert --"--, therefor On page 4, in column 1, under "Other Publications", line 34, before "U.S.". insert --"--, therefor On page 4, in column 1, under "Other Publications", line 35, after "2010,", insert --"--, therefor On page 4, in column 1, under "Other Publications", line 36, before "U.S.", insert --"--, therefor On page 4, in column 1, under "Other Publications", line 37, after "2012,", insert --"--, therefor On page 4, in column 1, under "Other Publications", line 38, before "U.S.", insert --"--, therefor On page 4, in column 1, under "Other Publications", line 39, after "2011,", insert --"--, therefor On page 4, in column 1, under "Other Publications", line 40, before "U.S.", insert --"--, therefor On page 4, in column 1, under "Other Publications", line 41, after "2012,", insert --"--, therefor On page 4, in column 1, under "Other Publications", line 42, before "U.S.", insert --"--, therefor On page 4, in column 1, under "Other Publications", line 43, after "2011,", insert --"--, therefor On page 4, in column 1, under "Other Publications", line 44. before "U.S.", insert --"--, therefor On page 4, in column 1, under "Other Publications", line 45, after "2011,", insert --"--, therefor On page 4, in column 2, under "Other Publications", line 1, before "U.S.", insert --"--, therefor On page 4, in column 2, under "Other Publications", line 2, after "2012,", insert --"--, therefor On page 4, in column 2, under "Other Publications", line 3, before "U.S.", insert --"--, therefor On page 4, in column 2, under "Other Publications", line 4, after "2011,", insert --"--, therefor On page 4, in column 2, under "Other Publications", line 29, delete "Inc." and insert --Inc.,--, therefor On page 4, in column 2, under "Other Publications", line 34, before "U.S.", insert --"--, therefor On page 4, in column 2, under "Other Publications", line 35, after "2012,", insert --"--, therefor On page 4, in column 2, under "Other Publications", line 36, before "U.S.", insert --"--, therefor On page 4, in column 2, under "Other Publications", line 36, after "2012,", insert --"--, therefor.

On page 4, in column 2, under "Other Publications", line 38, before "U.S.", insert --"--, therefor On page 4, in column 2, under "Other Publications", line 39, after "2012,", insert --"--, therefor On page 4, in column 2, under "Other Publications", line 40, before "U.S.", insert --"--, therefor On page 4, in column 2, under "Other Publications", line 41, after "2012,", insert --"--, therefor In the Specification In column 3, line 49, after "iteration", insert --.--, therefor In the Claims In column 8, line 67, in claim 2, delete "respondent," and insert --respondent;--, therefor In column 11, line 32, in claim 36, after "present", insert --the--, therefor